United States Patent
Yin et al.

(10) Patent No.: US 7,859,771 B2
(45) Date of Patent: Dec. 28, 2010

(54) IMAGING MODULE WITH HIGH RESOLUTION AND COMPACT SIZE

(75) Inventors: Chun-Yi Yin, Taipei Hsien (TW); Chun-Hsiang Huang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 49 days.

(21) Appl. No.: 12/417,619

(22) Filed: Apr. 2, 2009

(65) Prior Publication Data

US 2010/0165484 A1 Jul. 1, 2010

(30) Foreign Application Priority Data

Dec. 25, 2008 (CN) .................. 2008 1 0306543

(51) Int. Cl.
*G02B 9/34* (2006.01)
*G02B 3/02* (2006.01)
*H04N 5/262* (2006.01)

(52) U.S. Cl. .............. 359/773; 348/240.3; 359/772; 359/771; 359/715

(58) Field of Classification Search ............ 348/240.3; 359/715, 771, 772, 773

See application file for complete search history.

(56) References Cited

U.S. PATENT DOCUMENTS 7,764,443 B2 * 7/2010 Zhao et al. ............... 359/773
2010/0097709 A1 * 4/2010 Tsai ......................... 359/715

* cited by examiner

*Primary Examiner*—David N Spector
(74) *Attorney, Agent, or Firm*—Zhigang Ma

(57) ABSTRACT

An imaging lens includes an imaging lens system and an image sensor. The imaging lens system includes a first lens, a second lens, a third lens, and a fourth lens. The imaging module satisfies the formulas (1) $D/T \geq 1.1$, (2) $-3.5 < R2/F1 < -1.5$, (3) $-2.5 < R3/F2 < -0.5$, and (4) $1.5 < |R7/F4| < 3.5$, wherein D is the diagonal length of the sensing area of the image sensor, T is the length from the object surface of the first lens to the sensing surface of the image sensor, R2 is the radius of curvature of the image side surface of the first lens, R3 is the radius of curvature of the object side surface of the second lens, R7 is the radius of curvature of the object side surface of the fourth lens, F1, F2, F4 are the corresponding focal length of the first lens, the second lens, and the third lens.

9 Claims, 7 Drawing Sheets

IMAGING MODULE WITH HIGH RESOLUTION AND COMPACT SIZE

BACKGROUND

1. Technical Field

The disclosure relates to imaging modules and, particularly, to an imaging module providing high resolution with reduced overall length.

2. Description of Related Art

To optimize image quality, small imaging modules for use in thin devices, such as mobile phones or personal digital assistant (PDA), must employ imaging lenses with high resolution but small overall length (the distance between the object-side surface of the imaging lens and the image plane of the imaging module). Factors affecting both the resolution and the overall length of the imaging lens, such as the number and positions of lenses employed, the optical power distribution of the employed lenses, and the shape of each employed lens. However, reducing the number of lenses can reduce the overall length of the imaging lens, but resolution will suffer. Conversely, increasing the number of lenses can increase resolution, but also increases overall length of the imaging modules.

Therefore, it is desirable to provide an imaging module which can overcome the described limitations.

BRIEF SUMMARY OF THE INVENTION

An imaging module includes an imaging lens and an image sensor opposite to the imaging lens. The imaging lens includes a first lens having a positive refractive power, a second lens having a negative refractive power, a third lens having a positive refractive power, and a fourth lens having a negative power arranged from an object side to an image side in that order. The imaging module satisfies the following formulas of: (1) $D/T \geq 1.1$, (2) $-3.5 < R2/F1 < -1.5$, (3) $-2.5 < R3/F2 < -0.5$, and (4) $1.5 < |R7/F4| < 3.5$, wherein D is the maximum available pixels per of the image sensor, T is the length from the object surface of the first lens to the sensing surface of the image sensor, R2 is the radius of curvature of the image side surface of the first lens, R3 is the radius of curvature of the object side surface of the second lens, R7 is the radius of curvature of the object side surface of the fourth lens, F1, F2, F4 are the corresponding focal length of the first lens, the second lens, and the fourth lens, respectively. The imaging module can reduce overall volume and improve image quality.

BRIEF DESCRIPTION OF THE DRAWINGS

Many aspects of the imaging module should be better understood with reference to the following drawings. The components in the drawings are not necessarily drawn to scale, the emphasis instead being placed upon clearly illustrating the principles of the present imaging module. Moreover, in the drawings, like reference numerals designate corresponding parts throughout the several views.

DETAILED DESCRIPTION

Embodiments of the present imaging module will now be described in detail with reference to the drawings.

Figure 1:
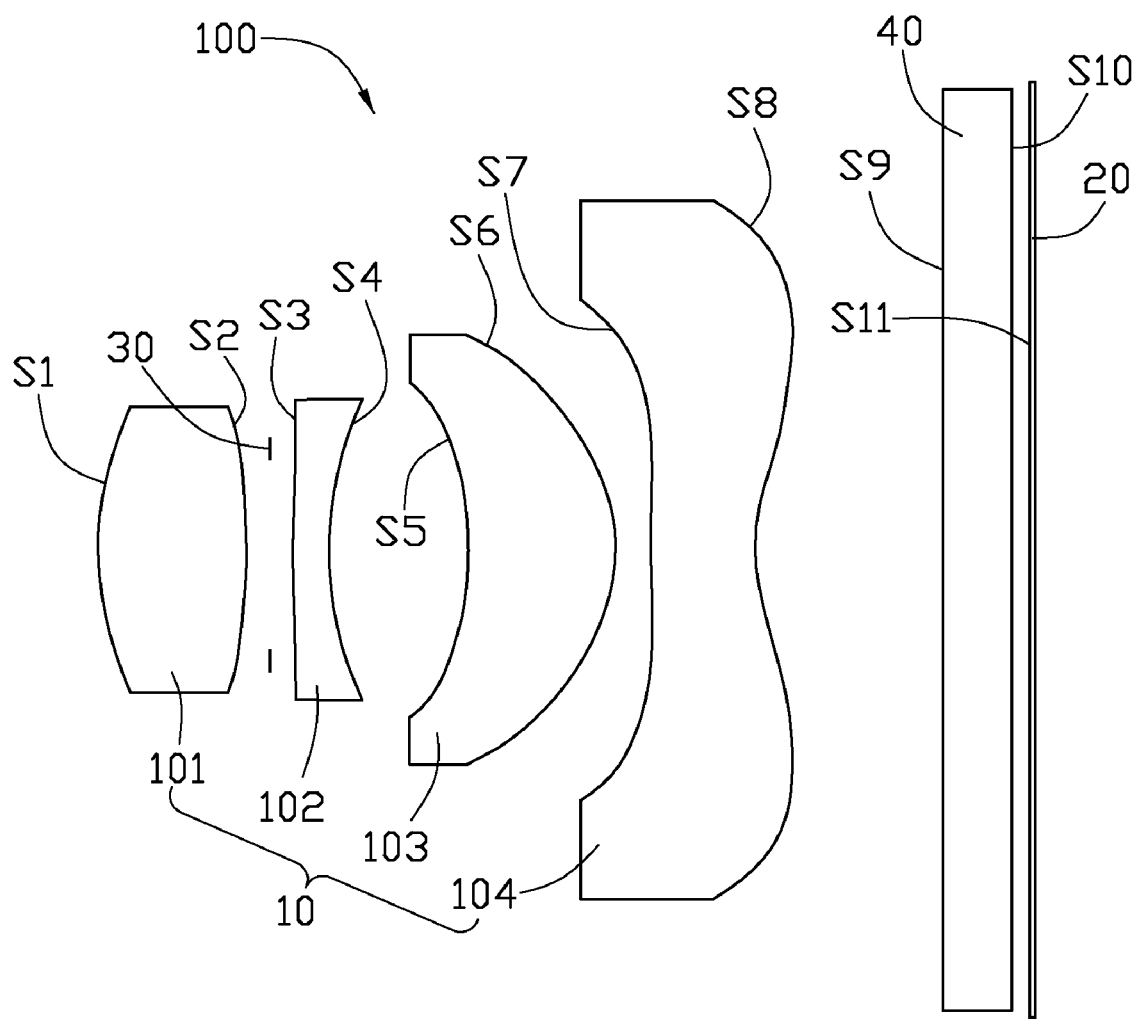
FIG. 1 is a schematic view of an imaging module in accordance with an exemplary embodiment.

Referring to FIG. 1, the imaging module 100, according to an exemplary embodiment, is shown. The imaging module 100 includes an imaging lens system 10 and an image sensor 20. The image sensor 20 is aligned with the imaging lens system 10 and placed at the image side of the imaging lens system 10. The imaging lens system 10 includes, in the order from the object side to the image side thereof, a first lens 101, a second lens 102, a third lens 103, and a fourth lens 104. The first lens 101 and the third lens 103 provide positive refractive. The second lens 102 and the fourth lens 104 provide negative refractive. The image sensor 20 includes a sensing surface S11 facing the imaging lens system 10.

The first lens 101, second lens 102, third lens 103 and fourth lens 104 correspondingly include an object side surface S1, S3, S5, S7, and an image side surface S2, S4, S6, S8.

The third lens 103 is crescent-shaped, and convex to the image side. The imaging module 100 satisfies the formulas:

$$D/T \geq 1.1, \tag{1}$$

$$-3.5 < R2/F1 < -1.5, \tag{2}$$

$$-2.5 < R3/F2 < -0.5, \text{ and} \tag{3}$$

$$1.5 < |R7/F4| < 3.5, \tag{4}$$

where D is the diagonal length of the sensing area of the image sensor 20, T is the distance from the object-side surface S1 of the first lens 101 to the sensing surface S11, i.e., the overall length of the imaging module 100, R2 is the radius of curvature of the image-side surface S2 of the first lens 101, F1 is the focal length of the first lens 101, R3 is the radius of curvature of the object-side surface S3 of the second lens 102, F2 is the focal length of the second lens 102, R7 is the radius of curvature of the object-side surface S7 of the fourth lens 104, F4 is the focal length of the fourth lens 104.

Formula (1) controls the refractive power of the imaging module 100 to obtain a desirably reduced overall length of the imaging module 100 and to control aberrations occurring therein within an acceptable range.

Formula (2) controls the refractive power of the image-side surface S2 of the first lens 101 to correct aberrations occurring in the imaging module 100, especially spherical aberration and distortion.

Formula (3) controls the refractive power of the object-side surface S3 of the second lens 102 to correct aberrations occurring in the imaging module 100, especially spherical aberration and astigmatism.

Formula (4) controls the refractive power of the object-side surface S7 of the fourth lens 104 to correct aberrations occurring in the imaging module 100, especially astigmatism and distortion.

The imaging module 100 further satisfies the formula: (5) $n2 > 1.58$, Where the n2 is the refractive index of the second lens 102. Formula (5) makes the light from the imaging lens system 10 to extend to the edge of the sensing area of the image sensor 20.

The imaging module 100 further includes an aperture stop 30. The aperture stop 30 is positioned between the first lens 101 and the second lens 102 and is configured to reduce the amount of light flux entering the second lens 102. Typically, the aperture stop 30 can block off-axis light rays and therefore can limit field curvature and distortion occurring in the imaging lens system 10, since the off-axis light rays is a major contributor to field curvature and distortion. Also, positioning the aperture stop 30 between the first lens 101 and the second lens 102 is beneficial for reducing the overall length T of the imaging module 100.

The imaging module also includes a cover glass 40, which is positioned between the image lens system 10 and the image sensor 20 for protecting the sensing area of the image sensor 20. The cover glass 40 includes an object side surface S9 and an image surface S10.

To correct chromatic aberration in the imaging module 100, the imaging module 100 further satisfies the formulas:

$$Vd1 > 55 \text{ and } Vd2 < 35 \quad (6)$$

where Vd1 is the Abbe number of the first lens 101 and Vd2 is the Abbe number of the second lens 102.

The four lenses 101, 102, 103, 104 can be made of plastic, to reduce costs, and all have two aspherical surfaces (i.e., the aspherical object-side surface and the aspherical image-side surface) to efficiently correct aberration. The aspherical surface is shaped according to the formula:

$$x = \frac{ch^2}{1 + \sqrt{1 - (k+1)c^2 h^2}} + \sum A_i h^i,$$

where h is a height from the optical axis of the imaging module 100 to the aspherical surface, c is a vertex curvature, k is a conic constant, and Ai are i-th order correction coefficients of the aspherical surfaces.

Detailed examples of the imaging module 100 are given below in company with FIGS. 2-7, but it should be noted that the imaging module 100 is not limited by these examples. Listed below are the symbols used in these detailed examples:

$F_{No}$: number;

2ω: field angle;

R: radius of curvature;

D: distance between surfaces on the optical axis of the imaging module 100;

Nd: refractive index of lens; and

Vd: Abbe constant.

When capturing an image, incident light enters the imaging lens system 10, sequentially transmits through four lenses 101, 102, 103, 104, the cover glass 40, and is finally focused onto the image sensor 20 to form a visual image.

Example 1

Tables 1, 2 show the lens data of Example 1, wherein F=5.38 mm, $F_{No}$=2.2, and 2ω=66°.

TABLE 1

| surface | R (mm) | D (mm) | Nd | Vd |
|---|---|---|---|---|
| S1 | 2.444251 | 1.2 | 1.531131 | 55.7539 |
| S2 | −7.760359 | 0.03 | — | — |
| S3 | 9.320206 | 0.3 | 1.631911 | 23.4152 |
| S4 | 2.948835 | 0.9555789 | — | — |
| S5 | −2.774919 | 1.2 | 1.54347 | 56.8 |
| S6 | −1.317209 | 0.03 | — | — |
| S7 | 7.888331 | 0.850975 | 1.514612 | 57.2 |
| S8 | 1.466087 | 1.536814 | — | — |
| S9 | infinite | 0.55 | 1.5168 | 64.167 |
| S10 | infinite | 0.15 | — | — |
| S11 | infinite | — | — | — |

TABLE 2

| Surface | Aspherical coefficient |
|---|---|
| S1 | k = −0.54853; A4 = −0.000863379; A6 = 0.0000747; A8 = −0.005225742; 0.002657; A12 = −0.00128 |
| S2 | k = 29.15224; A4 = −0.001086765; A6 = −0.04311; A8 = 0.035574; A10 = −0.01401; A12 = 0.002459 |
| S3 | k = −104.446; A4 = 0.006286879; A6 = −0.0483; A8 = 0.027811; A10 = −0.0025; A12 = −0.00066 |
| S4 | k = −1.304; A4 = 0.008268158; A6 = −0.00328; A8 = −0.00217; A10 = 0.005527; A12 = −0.00097 |
| S5 | k = −11.6432; A4 = −0.065424798; A6 = 0.01115; A8 = −0.01075; A10 = 0.006529; A12 = −0.00313 |
| S6 | k = −0.97131; A4 = 0.041903232; A6 = −0.02115; A8 = 0.003111; A10 = 0.000541; A12 = −0.00035 |
| S7 | k = −335.395; A4 = −0.055649714; A6 = 0.012305; A8 = −0.00223; A10 = 0.000176; A12 = −0.0000353 |
| S8 | k = −6.76007; A4 = −0.037291602; A6 = 0.007916; A8 = −0.00138; A10 = 0.000122; A12 = −0.00000508 |

Figure 2:
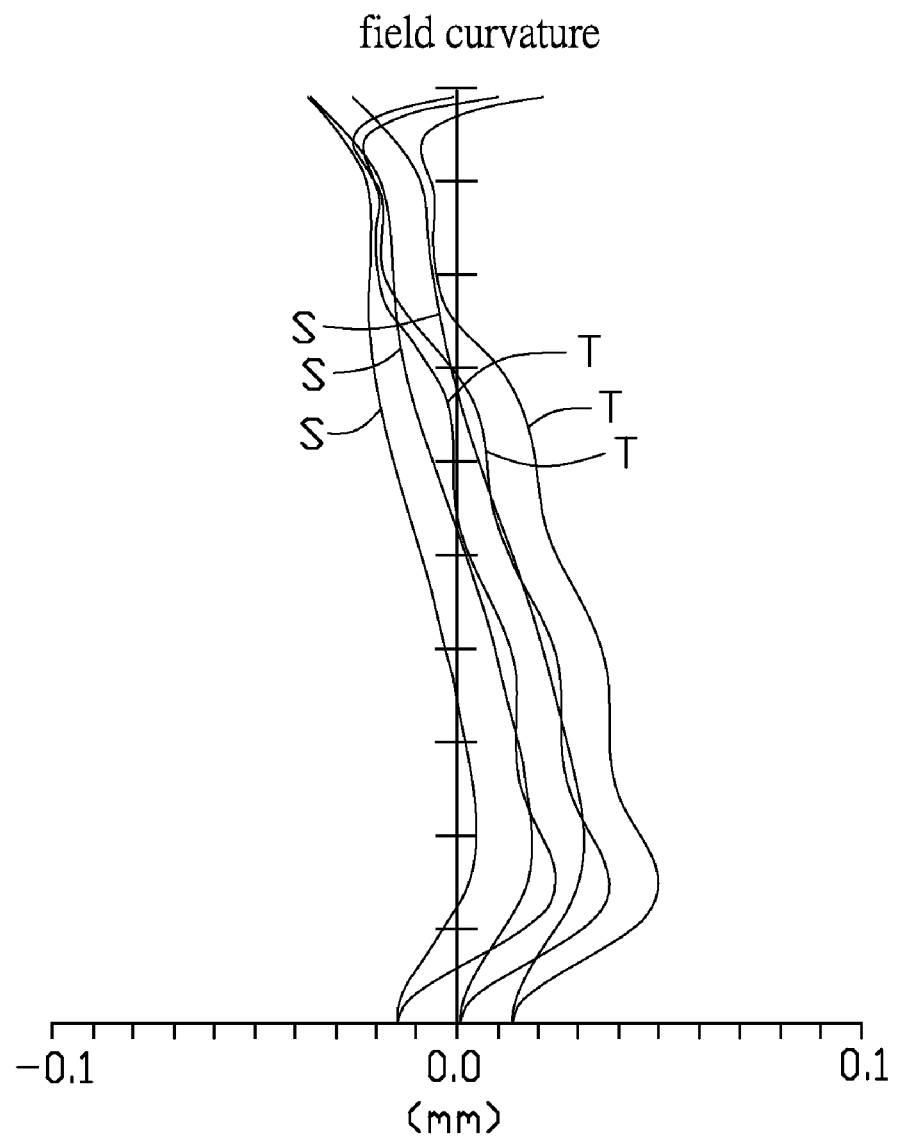
FIG. 2 is a graph field curvature diagram of the imaging module of FIG. 1, according to a first exemplary embodiment.
Figure 3:
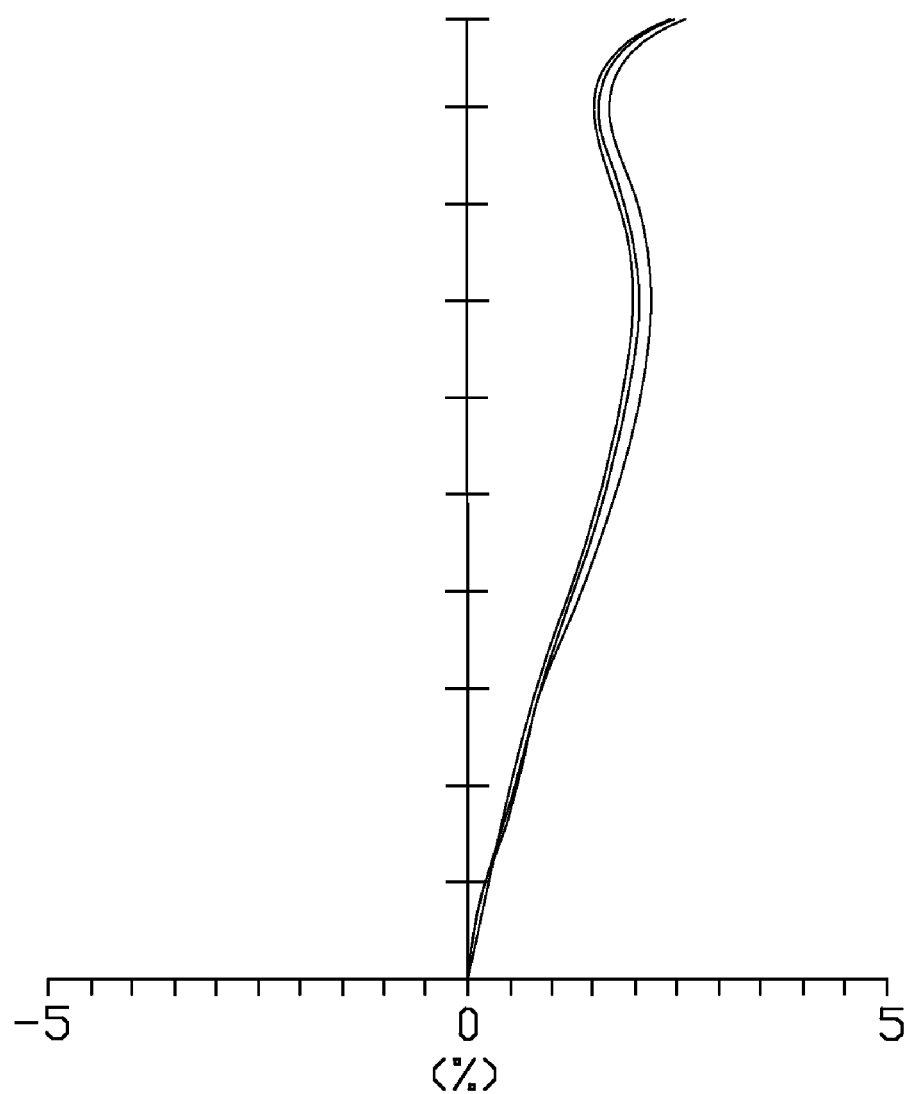
FIG. 3 is a distortion diagram of the imaging module of FIG. 1, according to the first exemplary embodiment.
Figure 4:
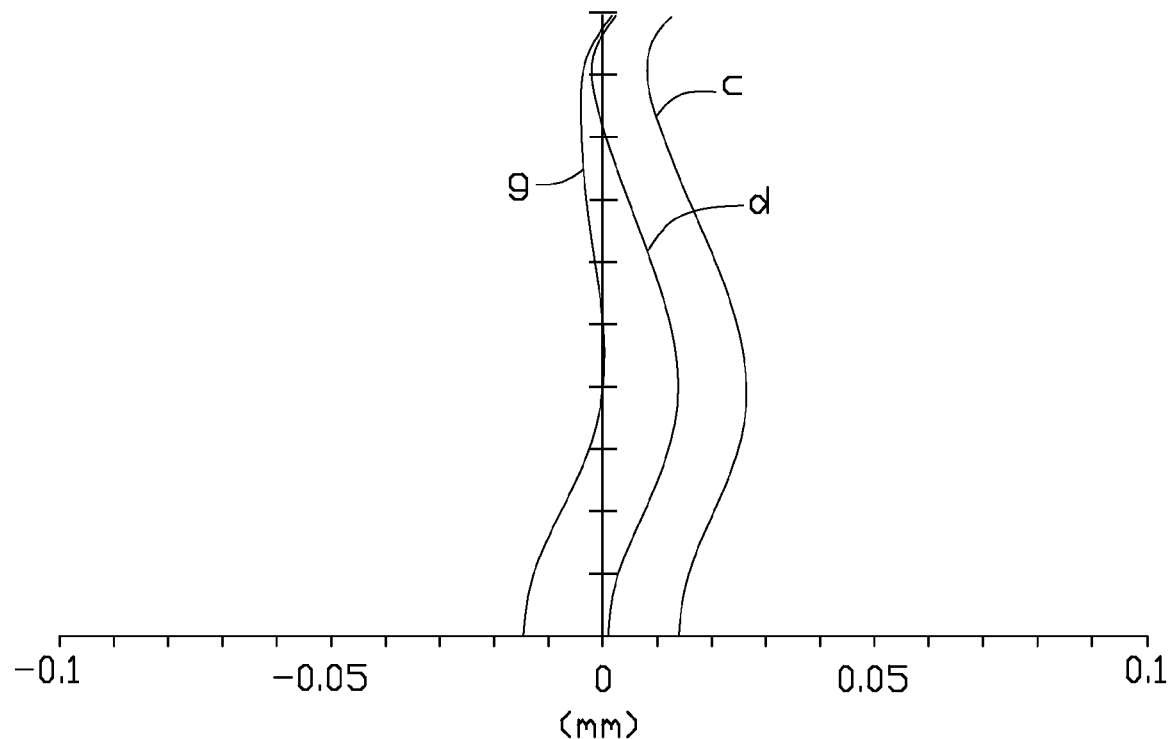
FIG. 4 is a spherical aberration diagram of the imaging module of FIG. 1, according to the first exemplary embodiment.

As illustrated in FIG. 2, the curves T, S are the tangential field curvature curve and the sagittal field curvature curve respectively. Clearly, field curvature occurring in the imaging, module 100 of Example 1 is limited to a range of: −0.04 mm~0.05 mm. In FIG. 3, distortion occurring in the imaging module 100 of Example 1 is limited within the range of: 0%~4%. In FIG. 4, the curves g, d, and c are respective spherical aberration characteristic curves of g light (wavelength: 435.8 nm), d light (587.6 nm), and c light (656.3 nm) occurring in the imaging module 100 of Example 1. Obviously, spherical aberration occurring in imaging module 100 of Example 1 is in a range of: −0.02 mm~0.03 mm.

Example 2

Tables 3, 4 show the lens data of EXAMPLE 2, wherein F=5.35 mm, $F_{No}$=2.3, and 2ω=68°.

TABLE 3

| surface | R (mm) | D (mm) | Nd | Vd |
|---|---|---|---|---|
| S1 | 2.191319 | 1.069028 | 1.531131 | 55.7539 |
| S2 | −9.30189 | 0.03 | — | — |
| S3 | 9.870309 | 0.3 | 1.631911 | 23.4152 |
| S4 | 2.900839 | 0.926426 | — | — |
| S5 | −2.39165 | 1.172785 | 1.54347 | 56.8 |
| S6 | −1.26949 | 0.03 | — | — |
| S7 | 11.26586 | 0.848696 | 1.514612 | 57.2 |
| S8 | 1.613242 | 1.56052 | — | — |
| S9 | infinite | 0.55 | 1.5168 | 64.167 |
| S10 | infinite | 0.15 | — | — |
| S11 | infinite | — | — | — |

TABLE 4

| Surface | Aspherical coefficient |
|---|---|
| S1 | k = −0.4883; A4 = −0.00011; A6 = 0.001507; A8 = −0.00888; A10 = 0.005736; A12 = −0.00282 |
| S2 | k = 43.08576; A4 = 0.020692; A6 = −0.06393; A8 = 0.0393; A10 = −0.01441; A12 = 0.002432 |
| S3 | k = −49.2982; A4 = 0.028161; A6 = −0.04916; A8 = 0.01995; A10 = −0.00188; A12 = 0.000501 |
| S4 | k = 0.678874; A4 = 0.012905; A6 = 0.011324; A8 = −0.01302; A10 = 0.008676; A12 = −0.00064 |
| S5 | k = −6.54626; A4 = −0.06647; A6 = 0.011167; A8 = −0.00459; A10 = 0.007833; A12 = −0.00291 |
| S6 | k = −1.18536; A4 = 0.044177; A6 = −0.02335; A8 = 0.003699; A10 = 0.001794; A12 = −0.00044 |
| S7 | k = −1157.86; A4 = −0.03476; A6 = 0.005819; A8 = −0.00012; A10 = −0.00013; A12 = 0.00000903 |
| S8 | k = −8.30334; A4 = −0.03358; A6 = 0.006455; A8 = −0.00113; A10 = 0.000106; A12 = −0.00000475 |

Figure 5:
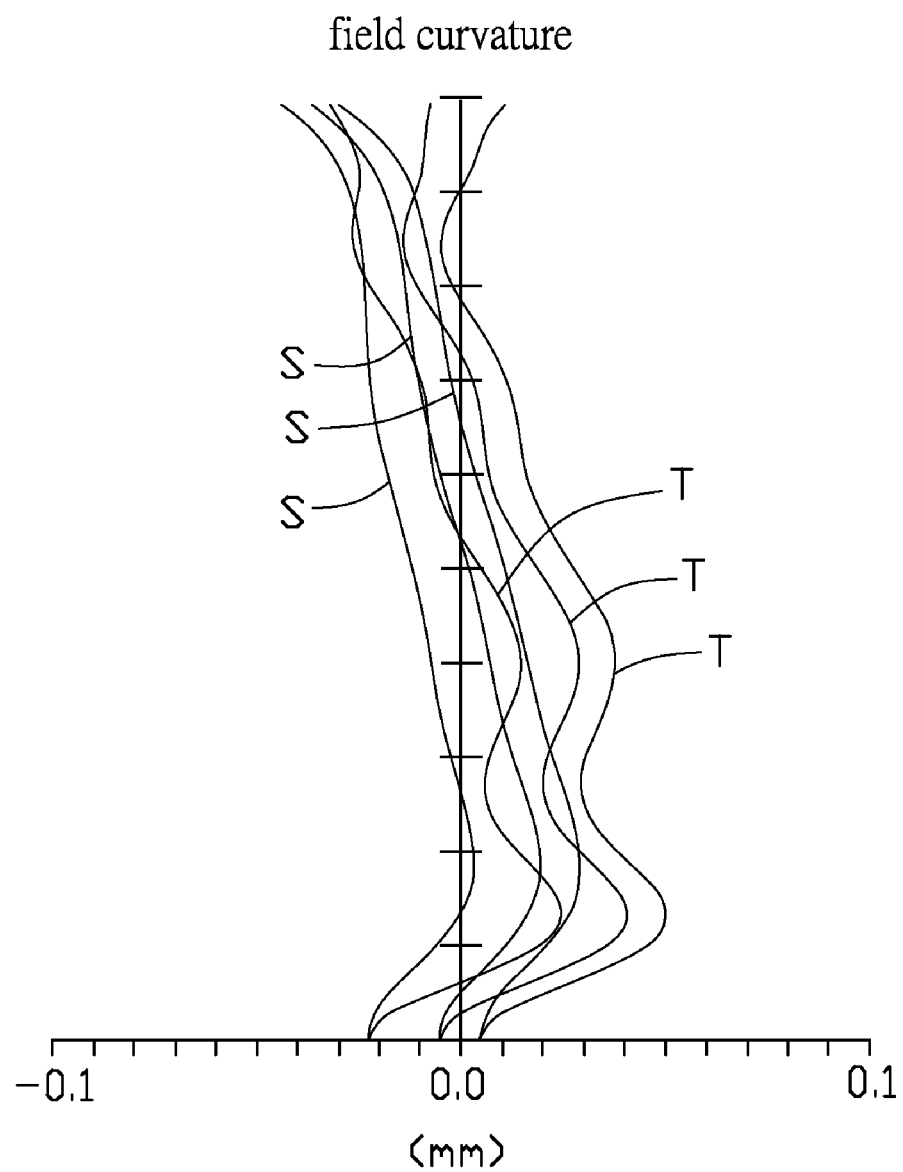
FIG. 5 is a graph field curvature diagram of the imaging module of FIG. 1, according to a second exemplary embodiment.
Figure 6:
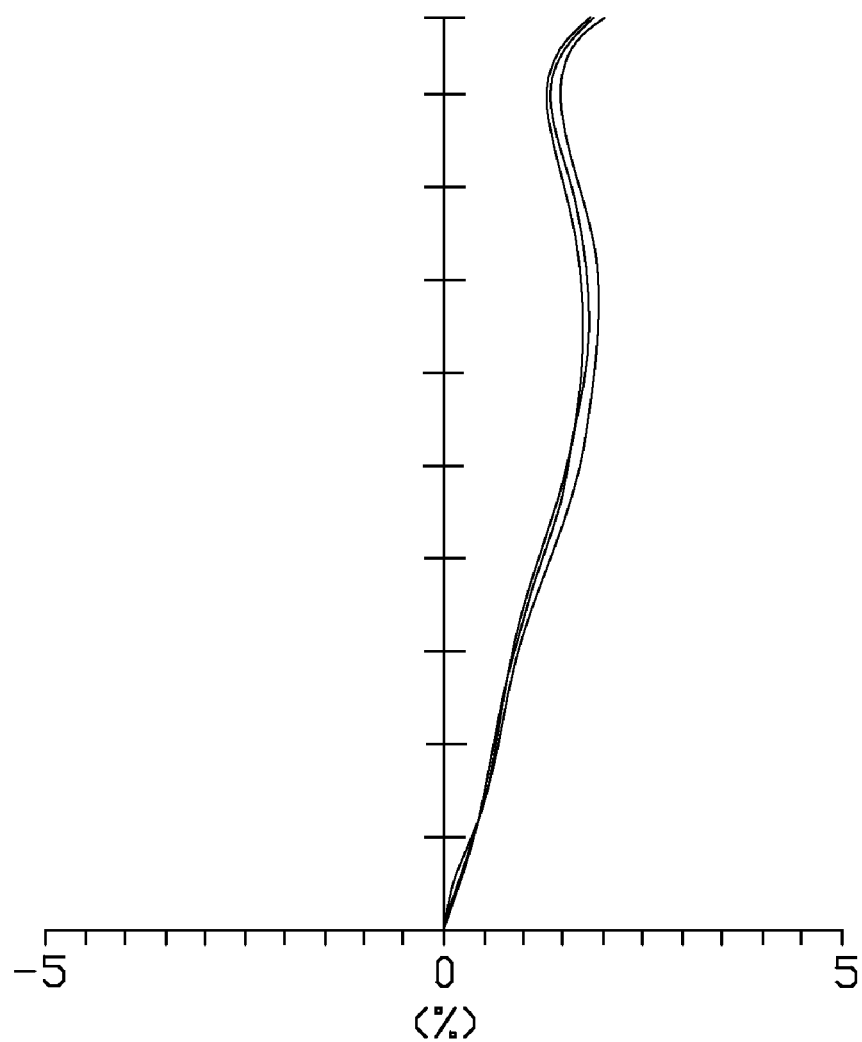
FIG. 6 is a distortion diagram of the imaging module of FIG. 1, according to the second exemplary embodiment.
Figure 7:
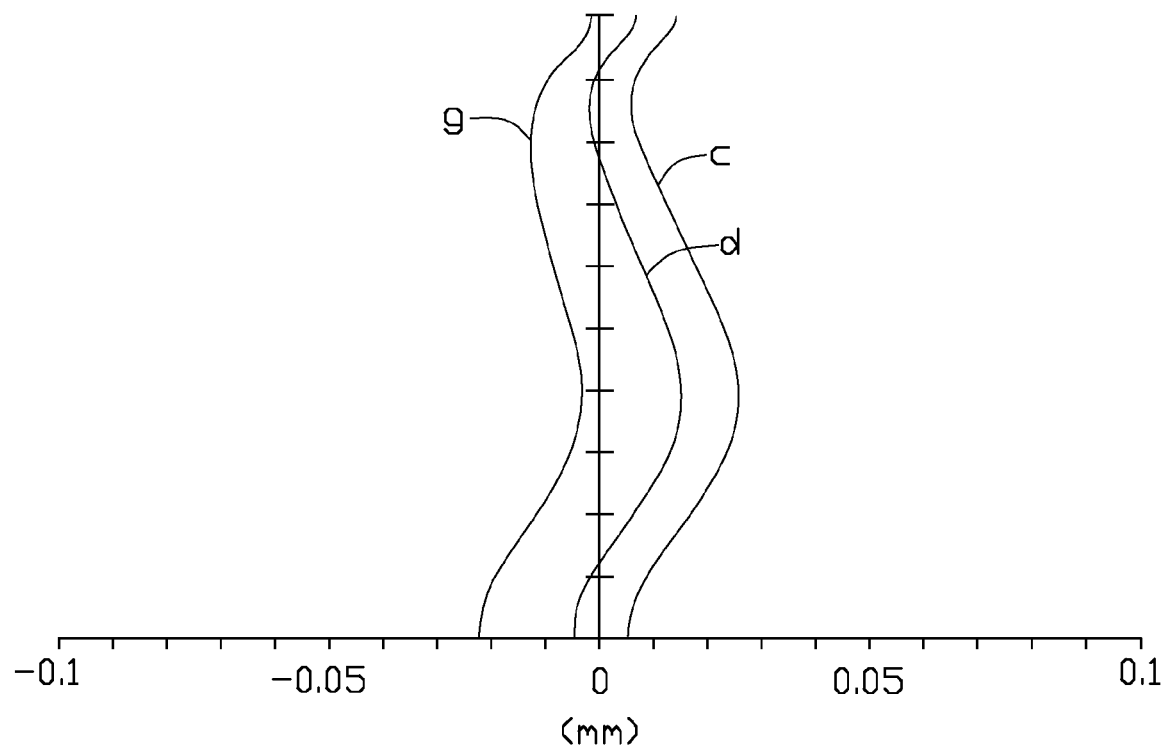
FIG. 7 is a spherical aberration diagram of the imaging module of FIG. 1, according to the second exemplary embodiment.

As illustrated in FIG. 5, field curvature occurring in the imaging module 100 of Example 2 is limited to a range of: −0.05 mm~0.05 mm. As shown in FIG. 6, distortion occurring in the imaging module 100 of Example 2 is limited to be within the range of: −2.0%~2.0%. In FIG. 7, spherical aberration occurring in imaging module 100 of Example 2 is in a range of: −0.03 mm~0.03 mm.

To summarize examples 1-2, though the overall length of the imaging module 100 is reduced, the resolution is enhanced and even improved, since aberrations are controlled/corrected within an acceptable range.

It will be understood that the above particular embodiments and methods are shown and described by way of illustration only. The principles and the features of the disclosure may be employed in various and numerous embodiment thereof without departing from the scope of the invention as claimed. The above-described embodiments illustrate the scope of the invention but do not restrict the scope of the invention.

What is claimed is:

1. An imaging module comprising:
   an imaging lens system comprising, in the order from the object side to the image side thereof, a first lens of positive refractive power, a second lens of negative refractive power, a third lens of positive refractive power, and a fourth lens of negative refractive power; and
   an image sensor placed aligned with the imaging lens system and placed at the image side of the imaging lens system,
   wherein the imaging module satisfying the formulas:

$D/T \geq 1.1$, $-3.5 < R2/F1 < -1.5$, $-2.5 < R3/F2 < -0.5$, and $1.5 < |R7/F4| < 3.5$, wherein D is the diagonal length of the sensing area of the image sensor, T is the length from the object surface of the first lens to the sensing surface of the image sensor, R2 is the radius of curvature of the image side surface of the first lens, F1 is the focal length of the first lens, R3 is the radius of curvature of the object side surface of the second lens, F2 is the focal length of the second lens, R7 is the radius of curvature of the object side surface of the fourth lens, F4 is the focal length of the fourth lens.

2. The imaging module as claimed in claim 1, wherein the first, second, third and fourth lenses are made of plastic.

3. The imaging module as claimed in claim 1, wherein the imaging module further comprises an aperture stop disposed between the first lens and the second lens.

4. The imaging module as claimed in claim 1, wherein the imaging module further satisfies the formulas:

$Vd1 > 55$; and $Vd2 < 35$, wherein Vd1 is the Abbe number of the first lens and Vd2 is the Abbe number of the second lens.

5. The imaging module as claimed in claim 1, wherein the first, second, third and fourth lenses are aspherical lenses.

6. The imaging module as claimed in claim 1, wherein the third lens is a meniscus lens and convex to the image side.

7. The imaging module as claimed in claim 1, wherein as cover glass is positioned between the image lens system and the image sensor for protecting the sensing area of the image sensor.

8. The imaging module as claimed in claim 1, wherein the imaging module further satisfies the formula:

$n2 > 1.58$, wherein the n2 is the refractive index of the second lens.

9. The imaging module as claimed in claim 8, wherein the imaging module further satisfies the formulas:

$Vd1 > 55$; and $Vd2 < 35$, wherein Vd1 is the Abbe number of the first lens and Vd2 is the Abbe number of the second lens.

* * * * *